(12) United States Patent
Miura

(10) Patent No.: US 6,826,904 B2
(45) Date of Patent: Dec. 7, 2004

(54) APPARATUS AND A METHOD FOR CONTROLLING EXHAUST GAS PURIFICATION FOR A DIESEL ENGINE

(75) Inventor: Manabu Miura, Zushi (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 10/273,923

(22) Filed: Oct. 21, 2002

(65) Prior Publication Data

US 2003/0074892 A1 Apr. 24, 2003

(30) Foreign Application Priority Data

Oct. 22, 2001 (JP) .......................................... 2001-323101

(51) Int. Cl.[7] .................................................. F01N 3/00
(52) U.S. Cl. .............................. 60/284; 60/274; 60/285; 60/289; 60/292; 60/293
(58) Field of Search ........................... 60/274, 284, 285, 60/278, 280, 289, 290, 292, 293

(56) References Cited

U.S. PATENT DOCUMENTS 5,600,948 A * 2/1997 Nakajima et al. ............. 60/276
5,675,968 A * 10/1997 Katashiba et al. ............. 60/276
5,974,792 A * 11/1999 Isobe ............................ 60/278
5,992,143 A * 11/1999 Manaka et al. ............... 60/284
6,044,643 A *  4/2000 Ittner et al. ................... 60/289
6,155,043 A * 12/2000 Zhang et al. .................. 60/284

FOREIGN PATENT DOCUMENTS

JP         8-74676 A     3/1996

* cited by examiner

Primary Examiner—Binh Q. Tran
(74) Attorney, Agent, or Firm—Foley & Lardner LLP

(57) ABSTRACT

In a cold condition before a warming-up completion in a diesel engine, when an engine power is less than a predetermined value, an air excess rate is controlled to a second air excess rate being smaller than a target air excess rate set after the warming-up completion, thereby promoting a warming-up of an exhaust gas purification catalyst due to rise of an exhaust gas temperature, and when the engine power is more than the predetermined value, the air excess rate is controlled to a first air excess rate being larger than the target air excess rate, thereby decreasing HC emission quantity from a combustion chamber. Accordingly, a total emission quantity of HC at the clod condition is decreased.

13 Claims, 6 Drawing Sheets

APPARATUS AND A METHOD FOR CONTROLLING EXHAUST GAS PURIFICATION FOR A DIESEL ENGINE

FIELD OF THE INVENTION

The present invention relates to a technology for improving exhaust gas purification performance at a cold condition for a diesel engine.

BACKGROUND OF THE INVENTION

In a diesel engine an air excess rate is controlled by a throttle valve, an EGR valve and so on so that the air excess rate equals a target value corresponding to an engine operating condition. However, since a temperature in an engine combustion chamber is low in a cold condition immediately after the engine has started, a combustion temperature in the engine combustion chamber is also low and more hydrocarbons (HC) emit from the combustion chamber.

EGR gases (exhaust gases) contain many components having a high specific heat such as carbon monoxide (CO), which reduce the combustion temperature. Therefore, the EGR is undesirable. Namely it is undesirable to control the air excess rate to equal the target value set corresponding to the engine operating condition when the engine is operating in the cold condition as contrasted with operation in a warm condition.

Japanese Unexamined Patent Publication No. 8-74676 discloses that HC emitted from the engine combustion chamber is restricted by decreasing an opening angle of the EGR valve in the cold condition for a larger air excess rate. The entire contents of this publication are incorporated herein by reference.

SUMMARY OF THE INVENTION

However, in the above noted technology the air excess rate is increased in the cold condition only for purification in the exhaust gases from the engine combustion chamber and it raises the following problems.

Vehicle engines are provided with an exhaust gas purification mechanism in an exhaust system therein such as a catalyst and a filter which purify exhaust gases from the engine combustion chamber. The exhaust gas purification mechanism can purify exhaust gas components at an activated state thereof wherein an exhaust gas temperature is high and can not purify them at a non-activated state thereof wherein it is low.

Accordingly, when the engine is cold, a temperature of the exhaust gas purification mechanism is low and it is in a non-activated state, and the exhaust gas components are emitted into an atmosphere without purification until the temperature of the exhaust gas purification mechanism gets high. An air excess rate has an inverse relationship with the exhaust gas temperature, such that the exhaust gas temperature is higher as the air excess rate is smaller, and the rise of the air excess rate brings about lowering the exhaust gas temperature.

Accordingly, when the air excess rate is controlled to be high in the cold condition as in the above-mentioned, HC emitted from the engine combustion chamber is restricted, but on the other hand, raising the temperature of the exhaust gas purification mechanism takes longer due to rising the air excess rate, thereby demanding more time for activate the exhaust gas purification mechanism.

There are some cases, therefore, where during warning the engine and the exhaust gas purification mechanism a total quantity of the exhaust gas components emitted from exhaust gas purification mechanism (to an atmosphere) increases rather than decreases.

One aspect of the present invention, in view of the foregoing problem, properly controls an air excess rate in a cold condition to decrease a total quantity of HC emitted into an atmosphere as much as possible during warming of an engine and an exhaust gas purification mechanism.

Therefore, the present invention sets a target air excess rate based upon an engine operating condition detected by a sensor, wherein in a cold condition (before the engine is not yet warmed), when an engine power is more than a predetermined value, the air excess rate is controlled to be equal to a first air excess rate greater than the target air excess rate. When the engine power is less than the predetermined value, the air excess rate is controlled to be equal to a second air excess rate smaller than the first air excess rate.

The other objects and features of the present invention will be understood from the following description with accompanying drawings.

DETAILED DESCRIPTION OF THE EMBODIMENTS OF THE INVENTION

Figure 1:
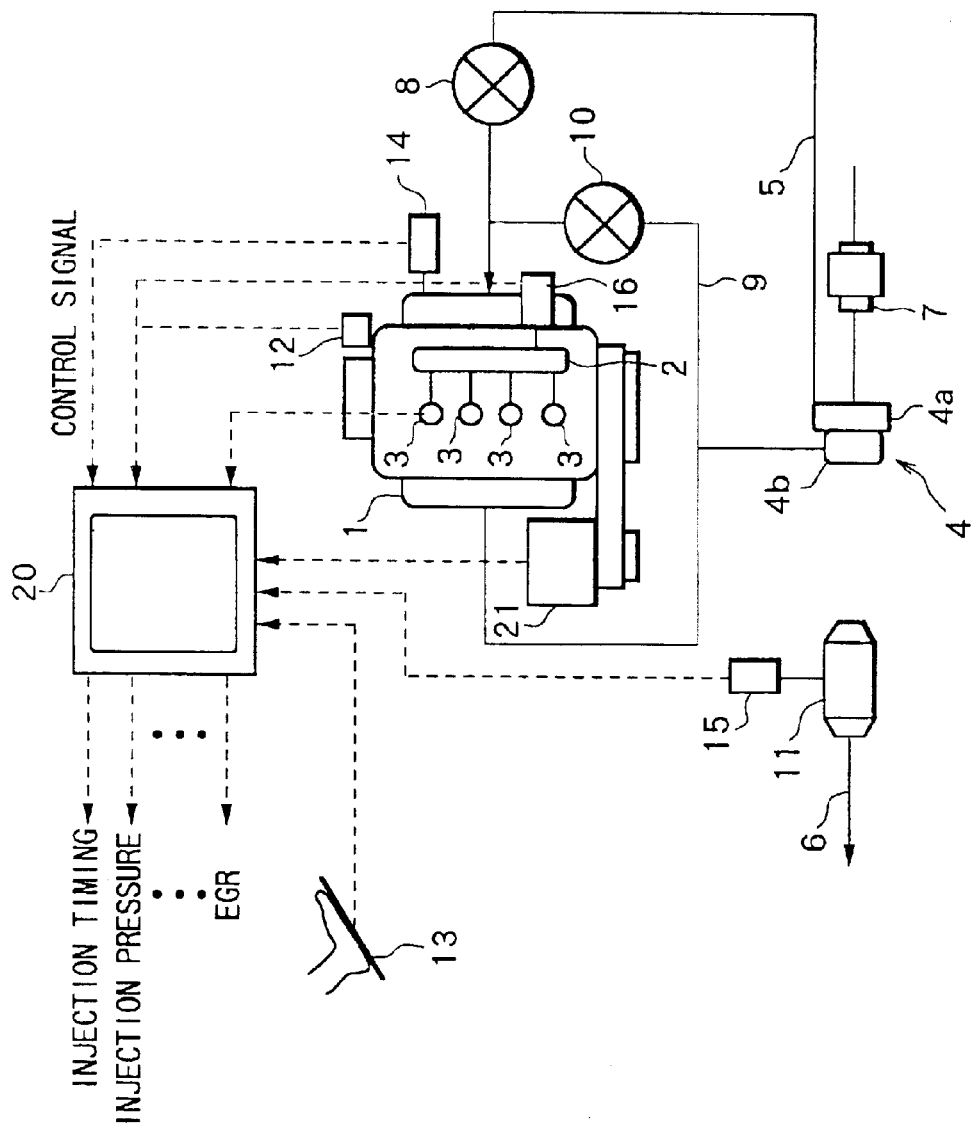
FIG. 1 is a system view according to an embodiment of the present invention.

FIG. 1 shows a system of an exemplary diesel engine to which the embodiments of the present invention can be applied.

As shown in FIG. 1, an engine body 1 includes a common rail fuel injection system comprising a common rail 2, fuel injection valves 3 and a fuel pump (not shown), which supply a highly pressurized fuel to engine body 1.

A compressor 4a of a supercharger 4 is connected to an intake passage 5 and is driven by a turbine 4b connected to an exhaust passage 6 for supplying pressurized air into engine body 1.

An air flow meter 7 is disposed upstream of compressor 4a of supercharger 4 and an intake throttle valve 8 is disposed downstream thereof in intake passage 5.

Intake throttle valve 8 is an electronically controlled type valve an opening angle of which can vary by a step motor and controls an intake air quantity sucked into engine body 1.

In exhaust passage 6 are disposed an EGR passage 9 branched from between engine body 1 and turbine 4b of supercharger 4 and connected to intake passage 5, an EGR valve 10 inserted in EGR passage 9, and an oxidizing catalyst 11 with a HC absorption function disposed downstream of turbine 4b of supercharger 4. This oxidizing catalyst 11 comprises an exhaust gas purification mechanism.

EGR valve 10 is of an electrically controlled type valve using the step motor, which controls an exhaust gas quantity recirculated into the intake side corresponding to its opening angle, that is, the EGR quantity sucked into engine body 1.

Oxidizing catalyst 11 absorbs HC in the exhaust gases at a low temperature and oxidizes HC and CO. Sensors for detecting various conditions are disposed, including air flow meter 7 which detects an intake air quantity Qa, a rotation speed sensor 12 which detects an engine rotation number Ne, an acceleration opening angle sensor 13 which detects an acceleration opening angle, a water temperature sensor 14 which detects a water temperature Tw, a thermocouple 15 which detects a temperature of oxidizing catalyst 11 with HC absorption function, a rail pressure sensor 16 which detects a fuel pressure (fuel injection pressure) in common rail 2, and other known sensors.

A control unit 20 sets a fuel injection quantity Qf and a fuel injection timing IT based upon the detection signals from the various sensors and also a detection signal from an auxiliary device 21 to control fuel injection valves 3 and also to control an opening angle of intake throttle valve 8 and EGR valve 10. Particularly, as relevant to the exemplary embodiments of the invention, when oxidizing catalyst 11 with HC absorption function is activated in a clod condition where the engine and the catalyst have not yet completed warming, the air excess rate is set a relatively low to increase the exhaust gas temperature at a specific condition (at a low engine power). As one basis for determination, the engine may be considered to complete its warming, i.e., be in a warmed state, when the engine temperature exceeds a threshold temperature. Other bases are also within the scope of the invention.

Figure 8:
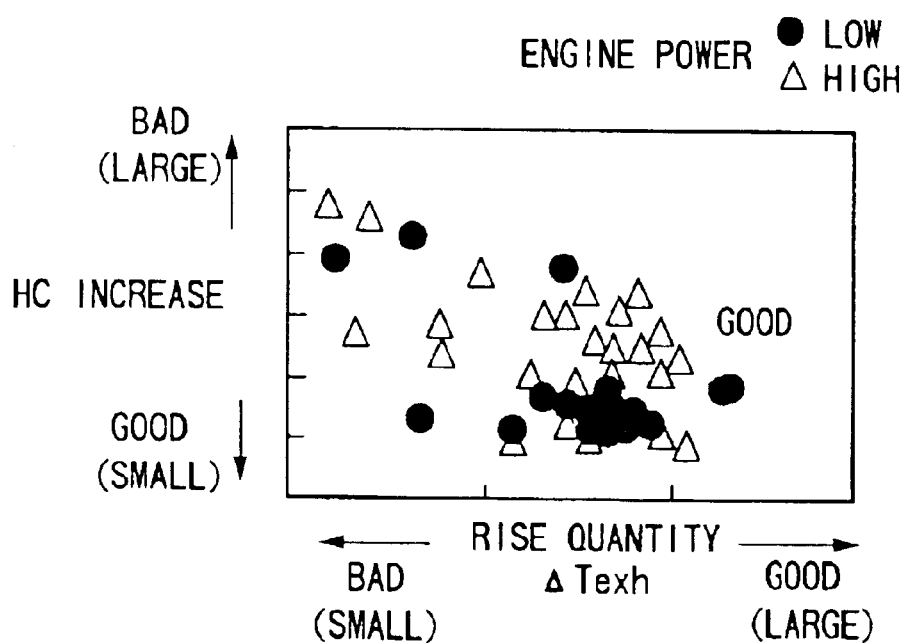
FIG. 8 is a view showing a relationship of a rise quantity of an exhaust gas temperature and a HC increase in a second air excess rate to that of a first air excess rate.

FIG. 8 depicts the results of calculations and experiments. In FIG. 8, an abscissa shows a rise quantity in the exhaust gas temperature and an ordinate shows an HC increase at an inlet of the catalyst, at the time when the air excess rate is controlled to a second air excess rate relative to the time when the air excess rate is controlled to a first air excess rate. Here, the first air excess rate is set to be smaller than the target air excess rate, and the second air excess rate is set to be larger than the target air excess rate.

As understood from FIG. 8, when the engine power is lower than a predetermined amount, an effect of raising the exhaust gas temperature by lowering the air excess rate exceeds the increase in HC. However, when the engine power exceeds the predetermined degree (such as power exceeding a certain degree), HC deterioration becomes conspicuous caused mainly by an exhaust gas flow increase and the effect of the early activation of the catalyst due to the exhaust gas temperature rise is reduced.

In view of the foregoing, the exemplary embodiments of the invention efficiently switch the air excess rate so as to manage both the rise of the exhaust gas temperature required for the early activation of the catalyst, and emissions from the engine and the combustion stability.

Figure 2:
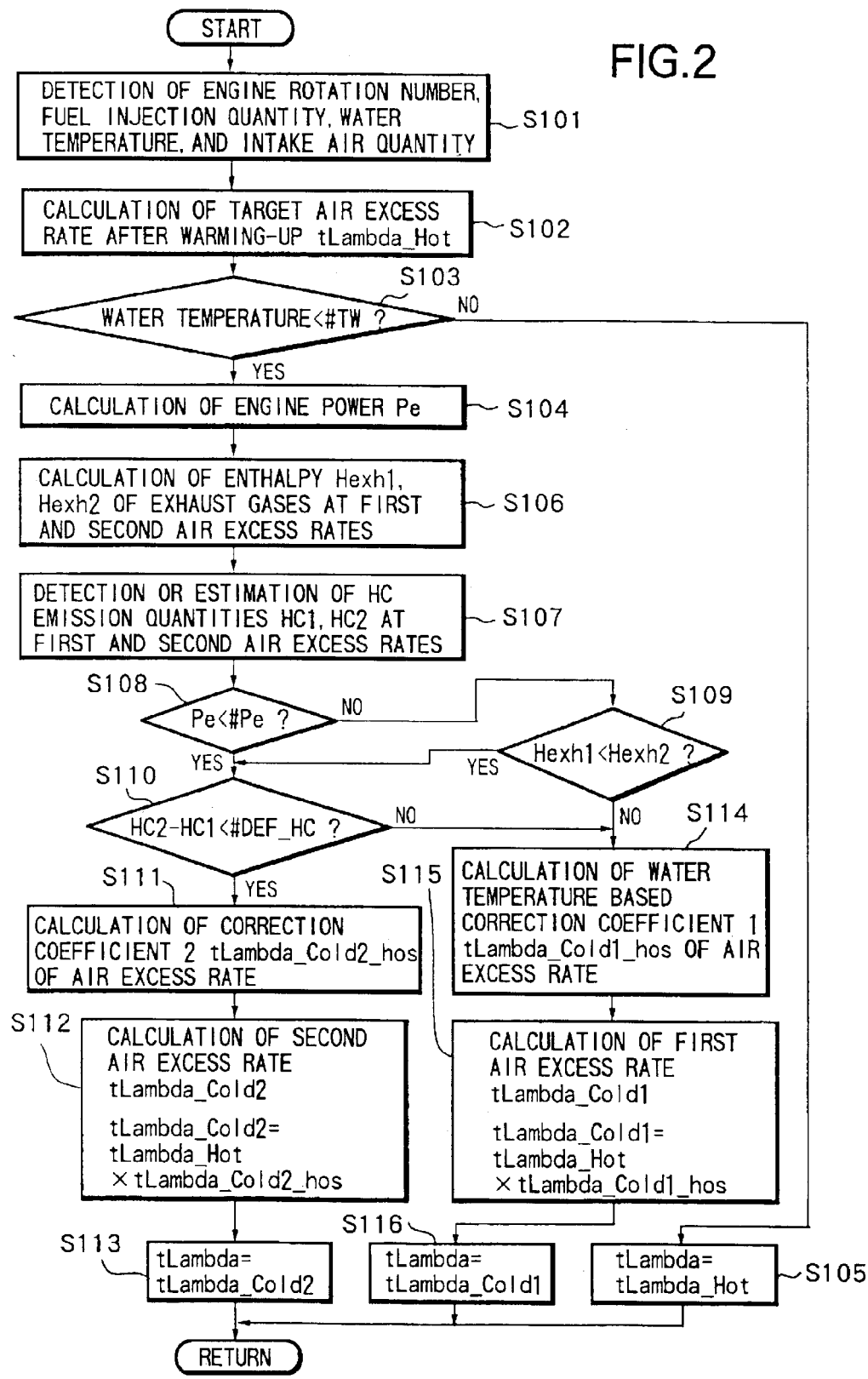
FIG. 2 is a flowchart showing a control routine of the above embodiment.

Control according to embodiments of the invention will be explained with reference to a flowchart in FIG. 2 as follows.

At step S101, an engine rotation number Ne, a fuel injection quantity Qf, a water temperature Tw, and an intake air quantity Qac are detected.

At step S102, a target air excess rate tLambda_Hot after an engine warming is calculated based upon the engine rotation number and the fuel injection quantity. In general, the target air excess rate gets smaller as the engine rotation number is small and the fuel injection quantity is large.

At step S103, when the water temperature Tw detected at step S101 is lower than a predetermined value #TW, the process goes to step S104 and when it is higher, the process goes to step S105.

At step S104, engine power is calculated. Engine power is determined as the product of engine rotation number and engine torque. Here the fuel injection quantity detected at step S101 is used as a value representative of the engine torque and an equivalent value of the engine power Pe is calculated by the following equation.

$$Pe = Ne \times Qf.$$

At step S105, when it is judged that the catalyst activation is completed, a final target air excess rate tLambda is set to tLambda_Hot and the flow ends.

At step S106, the exhaust gas temperature and the exhaust gas flow quantity are estimated when the air excess rate is controlled to the target air excess rate (the first air excess rate and the second air excess rate) in a cold condition (before the warming-up completion). An enthalpy of the exhaust gases is calculated based upon the exhaust gas temperature and the exhaust gas flow quantity. The exhaust gas temperature is simply estimated from the set air excess rate based upon a close relationship with the air excess rate. The exhaust gas flow quantity equals the sum of the intake air quantity and the fuel injection quantity. Accordingly, the enthalpy equivalent of the exhaust gases is simply calculated by the product of the exhaust gas temperature and the exhaust gas flow quantity.

At step S107, HC emission quantity is detected or estimated respectively (as HC1 and HC2) when the air excess rate is set as the first air excess rate and the second air excess rate. The HC quantity can be estimated approximately from the set air excess rate based upon a strong relationship between the air excess rate and the fuel injection quantity.

At step S108, when the engine power Pe is smaller than a predetermined value #PE, the process goes to step S110, and when the Pe is equal to or larger than #PE, the process goes to step S109 wherein the enthalpy Hexh 1 of the exhaust gases calculated at step S106 is compared with the enthalpy Hexh 2 thereof, and when the Hexh 1 is smaller, the process goes to step S10 and when the Hexh 2 is smaller, the process goes to step S114.

At S110, when a deviation between HC emission quantity HC1 and HC2 calculated at step S107 is less than a predetermined value #DEF_HC, the process goes to step S111, and when the deviation exceeds this predetermined value, the process goes to S114. In summary, in a cold condition, when either the engine power is small or when the exhaust gas enthalpy at the first air excess rate is smaller than the exhaust gas enthalpy at the second air excess rate and also a difference between HC emission quantity at the second air excess rate and at the first air excess rate is relatively small, selection of the second air excess rate brings about less increase of the HC emission quantity from the combustion chamber and larger effect of promotion of a warming-up activation of the catalyst due to the exhaust gas temperature rise.

Therefore, in such an instance, the total HC emission quantity can be decreased in a cold condition and the process goes to step S111. Otherwise, the first air excess rate is selected to decrease HC emission quantity from the combustion chamber, and the process goes to step S114.

Figure 4:
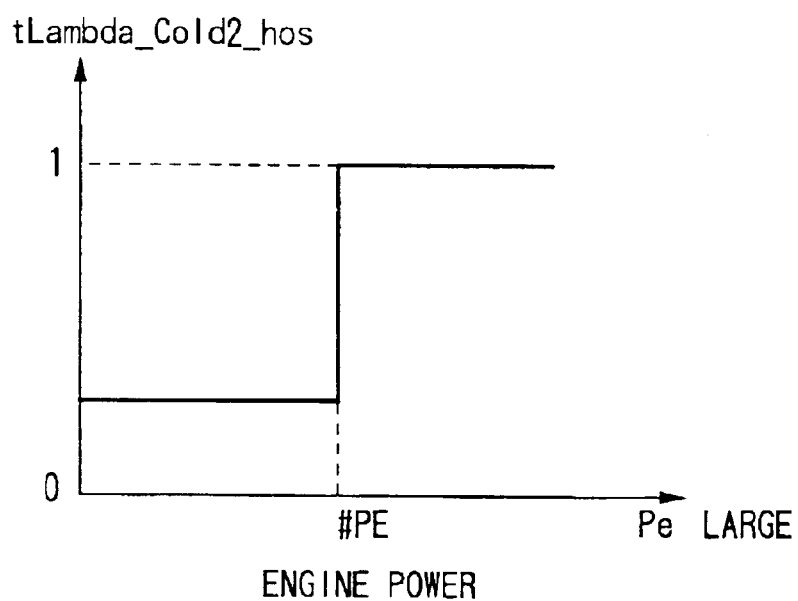
FIG. 4 is a view showing a calculation table of a correction coefficient #2 of the air excess rate to an engine power.

At step S111, a correction coefficient of the second air excess rate tLamda_Cold 2 selected based upon the above judgement is calculated. Since an absolute quantity of HC emission from the combustion chamber is small when the engine power Pe is less than a predetermined value #PE as shown in FIG. 4, it is possible to correct the air excess rate smaller. Therefore, a correction coefficient tLambda_Cold 2_hos is calculated to decrease the air excess rate.

Figure 5:
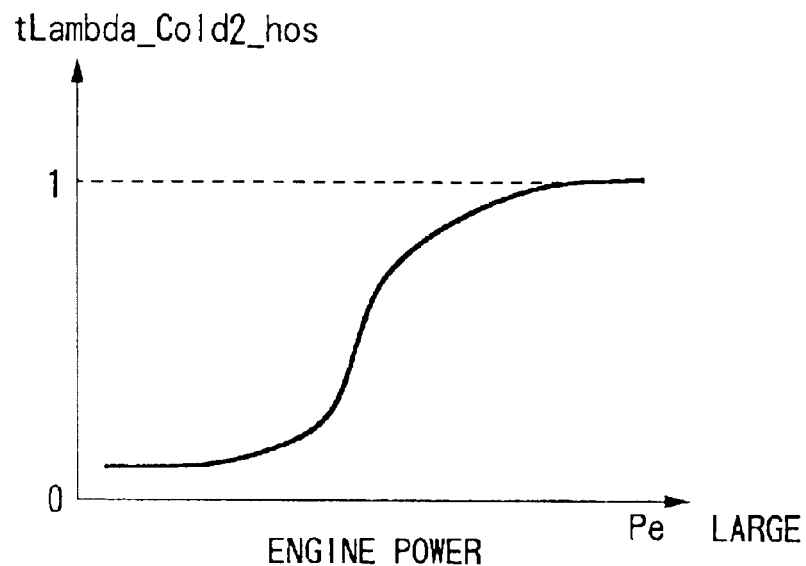
FIG. 5 is a view showing another calculation table of the correction efficient #2 of the air excess rate to the engine power.

Another method is to calculate a correction coefficient tLambda_Cold 2_hos to gradually make the correction coefficient smaller as the engine power becomes small as shown in FIG. 5.

At step S112, a second air excess rate tLambda_Cold 2 is calculated by multiplying the target air excess rate tLambda_Hot after the warming-up completion and the correction coefficient tLambda_Cold 2_hos calculated at step S111.

Figure 3:
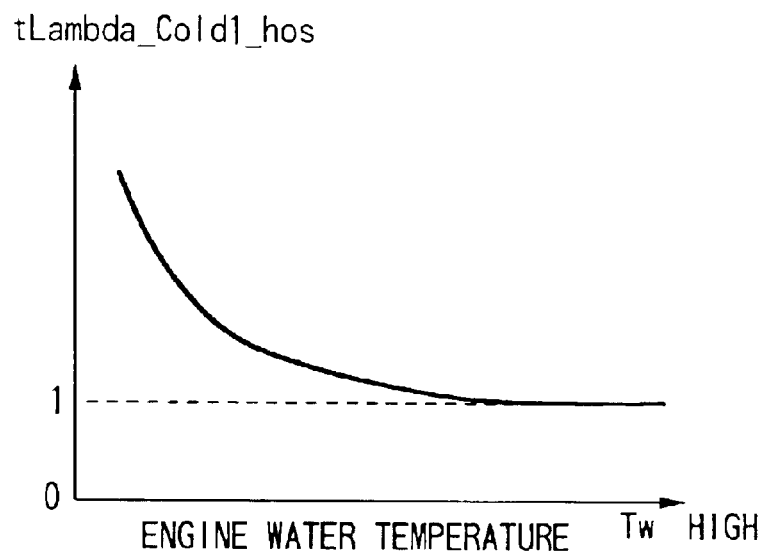
FIG. 3 is a view showing a calculation table of a correction coefficient 1 of an air excess rate.

At step S113, the second air excess rate tLambda_Cold 2 calculated at step S112 is set as a final target air excess rate tLambda and the flow ends. At step S114, a water correction coefficient tLambda_Cold 1_hos is calculated using the curve shown in FIG. 3 so that the first air excess rate set as the target air excess rate corresponding to the warming-up completion is corrected address the clod condition. This correction coefficient is calculated from a water temperature Tw.

At step S115, the first air excess rate is calculated by multiplying the target air excess rate tLambda_Hot after the warming-up completion and the water correction coefficient tLambda_Cold 1_hos calculated at step S114. At step S116, the first air excess rate calculated at step S115 is set as a final target air excess rate tLambda and the flow ends. As above, the first embodiment is explained where the target air excess rate is based upon the engine power at step S104. In the alternative, as a second embodiment, it can be based upon the engine rotation number and as a third embodiment, upon the fuel injection quantity.

Figure 6:
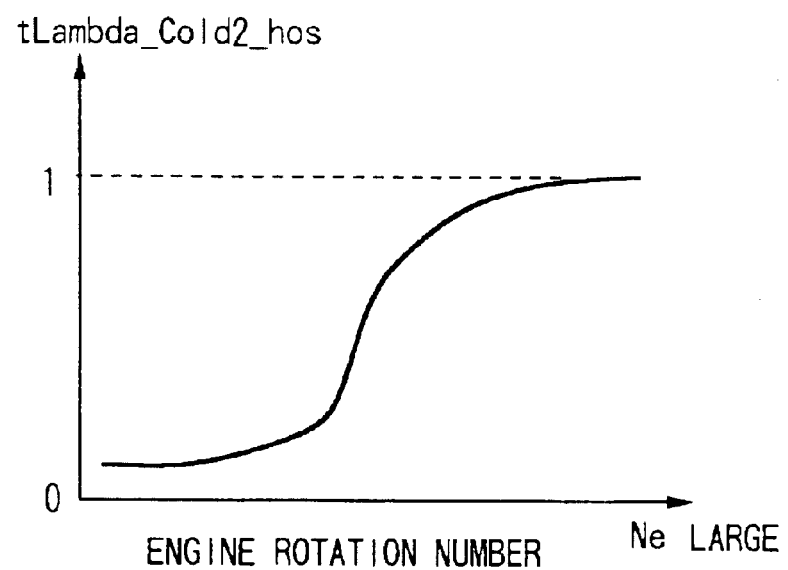
FIG. 6 is a view showing a calculation table of the correction coefficient #2 of the air excess rate to an engine rotation number.
Figure 7:
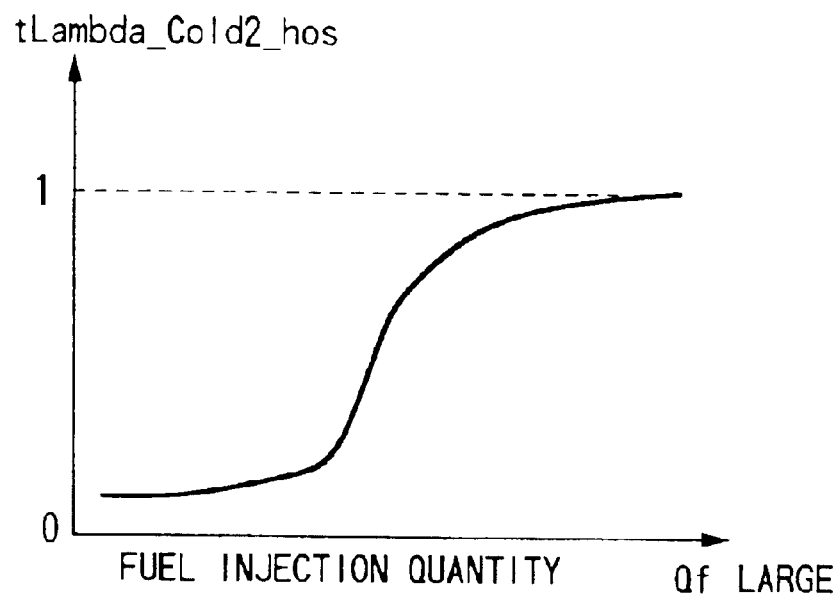
FIG. 7 is a view showing a calculation table of the correction coefficient #2 of the air excess rate to a fuel injection quantity.

As a calculation method of a correction coefficient of an air excess rate at step S111, in the second embodiment, a correction coefficient tLambda_Cold 2 to an engine rotation number Ne is calculated according to the curve shown in FIG. 6. In the third embodiment, a correction coefficient tLambda_Cold 2 to a fuel injection quantity is calculated according to the curve shown in FIG. 7.

Figure 9:
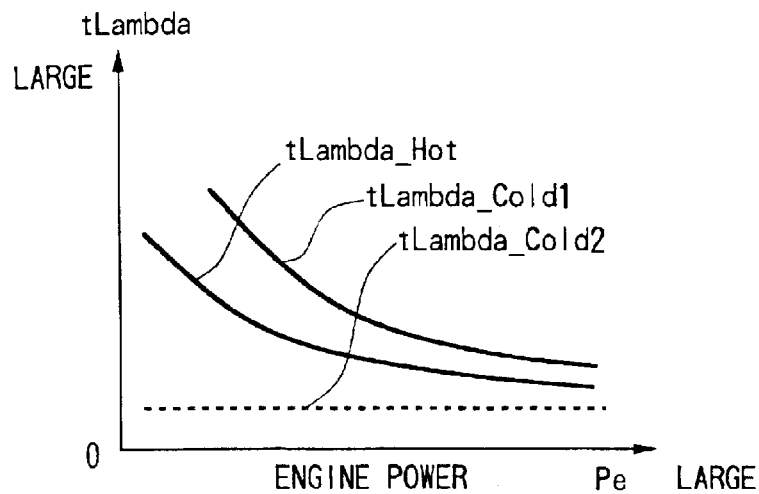
FIG. 9 is a view showing a relationship of the air excess rate after warming is completed, a first air excess rate, and a second air excess rate.
Figure 10:
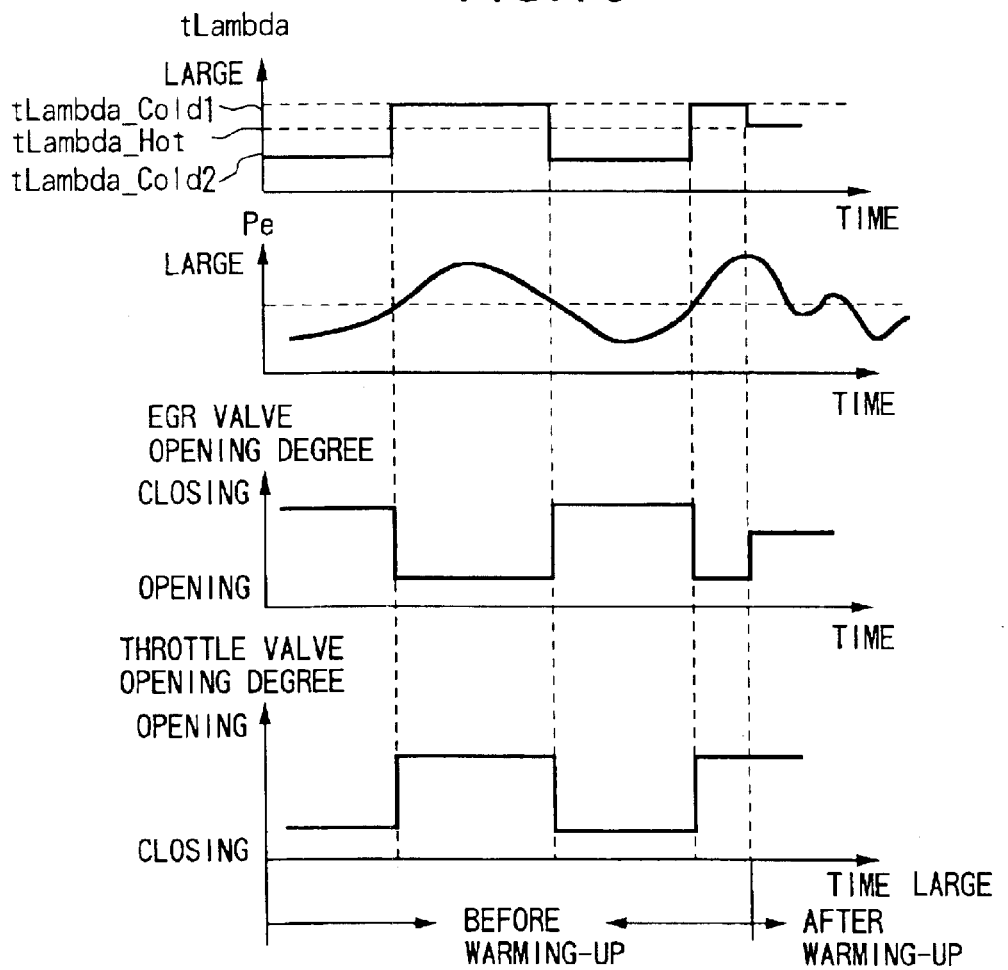
FIG. 10 is a view showing a target air excess rate, and operation of an EGR valve and a throttle valve according to the invention.

Based upon the control flow as described above, the target air excess rate, EGR valve 10, and throttle valve 8 operate as shown in FIG. 10. Exactly, tLambda-Hot and tLambda_Cold 1 are target values which change generally with an engine power, as shown in FIG. 9, but for simplification herein, the operation of FIG. 10 is illustrated by the simplified relationship of "tLambda_Hot<tLambda_Cold 1.

As described above, according to these embodiments, since the air excess rate is lowered only on a predetermined condition where the effect of raising the exhaust gas temperature is larger compared with a deterioration quantity of HC emitted from the combustion chamber, the total HC quantity emitted into an atmosphere in a cold condition is decreased. Particularly, since the second air excess rate is made smaller than the target air excess rate, an activation of catalyst 11 is promoted further by raising the exhaust gas temperature, thereby shortening time required for warming-up of catalyst 11.

Decreasing an air excess rate at the same engine power indicates decreasing an intake air quantity, and when the air excess rate is made small at a low engine power, the intake air quantity, as well as the exhaust gas flow quantity, decrease considerably. Accordingly, even if a density of HC emitted from engine body 1 is raised by lowering the air excess rate, deterioration quantity of HC emission from the combustion chamber is small due to decrease of the exhaust gas flow quantity.

As a result, a total quantity of HC emitted into an atmosphere in a cold condition can be decreased further. Moreover, in case where the second air excess rate is smaller as the engine power is small using a correction coefficient as shown in FIG. 5, the following effect can be obtained.

A big difference may occur in a combustion state between an oxygen excess state at the first air excess rate set as a large value and a low oxygen state at the second air excess rate set as a small value.

Therefore, switching only from the one state to the other state stepwise at a certain condition influences torque deviations, combustion noises, and exhaust gas emissions. Accordingly, an air excess rate is controlled to gradually change (such as over some predetermined minimum time to mitigate the effect of transient changes to engine operation) according to an engine power between the first air excess rate and the second air excess rate or between the target air excess rate after the warming-up completion and the second air excess rate. Thereby, transient changes and deterioration of the torque deviations, the combustion noises, and the emissions can be restricted.

In case the enthalpy of the exhaust gases is larger when the air excess rate is set as the second air excess rate than when the air excess rate is set as the first air excess rate, even if the engine power is more than the predetermined value, the following effects can be obtained by setting the air excess rate to the second air excess rate.

An activation of catalyst 11 is influenced by an exhaust gas flow quantity in addition to rise of an exhaust gas temperature. Catalyst 11 is activated earlier due to a great number of the exhaust gases with a high temperature passing through an exhaust gas purification mechanism. Namely, the air excess rate is controlled to the first air excess rate or the second air excess rate which has more enthalpy proportional to a product of the exhaust gas temperature and the exhaust gas flow quantity, thereby activating catalyst 11 more quickly. When a difference of HC emission quantity between the air excess rate as the first air excess rate and the air excess rate as the second air excess rate exceeds a predetermined value or threshold, even if the engine power is less than some predetermined amount, the air excess rate is controlled to the first air excess rate. Therefore, in a case where HC deterioration quantity is more than a predetermined value by making the air excess rate small aiming at an early activation of the catalyst 11, the deterioration of the HC emission quantity can be restricted by not lowering the air excess rate.

In case the engine rotation number is less than a predetermined value, the engine power is assumed to be less than a predetermined value and the air excess rate is switched based upon the engine rotation number, the control is simplified by replacing the engine power by the engine rotation number and also a control accuracy can be maintained due to a close relationship between the engine power and the engine rotation number.

In case an engine load is less than a predetermined value, the engine power is assumed to be less than a predetermined value and the air excess rate is switched based upon the engine load, the control is simplified by replacing the engine power by the engine load such as the fuel injection quantity and also a control accuracy can be maintained due to a close relationship between the engine power and the engine load.

Moreover, when the air excess rate is controlled by EGR valve 10 or throttle valve 8 to change from the first air excess rate to the second air excess rate, the air excess rate can be controlled to a small value easily and accurately by opening EGR valve 10 or closing throttle valve 8.

The entire contents of a Japanese Patent Application NO. 2001-323101, filed Oct. 22, 2001 to which priority is claimed are incorporated herein by reference.

While only selected embodiments have been chosen to illustrate the present invention, it will be apparent to those skilled in the art from this disclosure that various change and modification can be made herein without departing from the scope of the invention as defined with reference to the appended claims. Furthermore, the foregoing description of the embodiments according to the present invention are provided for illustration only, and not for the purpose of limiting the invention as defined by the appended claims and their equivalents.

What is claimed is:

1. An apparatus for controlling exhaust gas purification for a diesel engine, comprising:
    an exhaust gas purification apparatus which has an exhaust gas purification mechanism to purify exhaust gas components;
    a sensor which detects an engine operating condition; and
    an air excess rate controlling unit which controls an air excess rate,
    wherein, based on a detected warmed state of the engine, the air excess rate controlling unit controls the air excess rate to a target air excess rate set based on the detected engine operating condition, and
    wherein, during a time that the engine is not in a warmed state and an engine power exceeds a predetermined value, the air excess rate controlling unit controls the air excess rate to a first air excess rate larger than the target air excess rate, and
    wherein, during a time that the engine is not in a warmed state and an engine power is less than the predetermined value, the air excess rate controlling unit controls the air excess rate to a second air excess rate that is smaller than the first air excess rate.

2. An apparatus according to claim 1, wherein the second air excess rate is smaller than the target air excess rate.

3. An apparatus according to claim 1, wherein the air excess controlling unit reduces the second air excess rate with a reduced engine power.

4. An apparatus according to claim 1, wherein the air excess rate controlling unit controls the air excess rate during a time that the engine is in a cold state to the second air excess rate, although the engine power exceeds the predetermined value, when an enthalpy of exhaust gases for when the air excess rate is controlled to the second air excess rate is larger than the enthalpy of exhaust gases for when the air excess rate is controlled to the first air excess rate.

5. An apparatus according to claim 1, wherein the air excess rate controlling unit controls the air excess rate to the first air excess rate during a time that the engine is not in the warmed state, although the engine power is less than the predetermined value, when a difference of hydrocarbon emission quantity between when the air excess rate is controlled to the first air excess rate and when the air excess rate is controlled to the second air excess rate exceeds a predetermined value.

6. An apparatus according to claim 1, wherein the air excess rate controlling unit decides that the engine power is less than the predetermined value when an engine rotation value is less than a predetermined rotation number.

7. An apparatus according to claim 1, wherein the air excess rate controlling unit decides that the engine power is less than the predetermined value when an engine load is less than a predetermined engine load.

8. An engine including the apparatus according to claim 1, wherein the engine comprises an exhaust gas recirculation valve disposed in an exhaust gas recirculation passage connecting an exhaust passage to an intake passage and a throttle valve disposed in the intake passage that controls an intake air quantity, and
    wherein the air excess rate controlling unit causes at least the exhaust gas recirculation valve to open when the air excess rate is controlled to change from the first air excess rate to the second air excess rate.

9. An engine including the apparatus according to claim 1, wherein the engine comprises an exhaust gas recirculation valve disposed in an exhaust gas recirculation passage connecting an exhaust passage to an intake passage and a throttle valve disposed in the intake passage that controls an intake air quantity, and
    wherein the air excess rate controlling unit causes at least the throttle valve to close when the air excess rate is controlled to change from the first air excess rate to the second air excess rate.

10. The apparatus of claim 1, wherein the engine operating condition is one of engine rotation value, an acceleration opening degree, a water temperature, and oxidizing catalyst temperature.

11. The apparatus of claim 1, wherein the air excess rate controlling unit relatively changes the air excess rate over a predetermined minimum time period between the first air excess rate and the second air excess rate based on a change in engine power.

12. An apparatus for controlling exhaust gas purification for a diesel engine, comprising:
    exhaust gas purification means for purifying exhaust gas components;
    sensor means for detecting an engine operating condition; and
    air excess rate controlling means for controlling an air excess rate,
    wherein, based on a detected warmed state of the engine, the air excess rate controlling means controls the air excess rate to a target air excess rate set based on the detected engine operating condition, and
    wherein, during a time that the engine is not in a warmed state and an engine power exceeds a predetermined value, the air excess rate controlling means controls the air excess rate to a first air excess rate larger than the target air excess rate, and
    wherein, during a time that the engine is not in a warmed state and an engine power is less than the predetermined value, the air excess rate controlling means controls the air excess rate as to a second air excess rate that is smaller than the first air excess rate.

13. A method for controlling exhaust gas purification for a diesel engine with an exhaust gas purification mechanism which purifies exhaust gas components comprising:

detecting an engine operating condition;
   detecting an engine power;
   controlling an air excess rate to a target air excess rate set based on the detected engine operating condition;
   controlling the air excess rate to a first air excess rate larger than the target air excess rate when the engine is not in a warmed state and the detected engine power exceeds a predetermined value;
   controlling the air excess rate to a second air excess rate that is smaller than the first air excess rate when the engine is not in a warmed state and the detected engine power is less than the predetermined value.

* * * * *